UNITED STATES PATENT OFFICE.

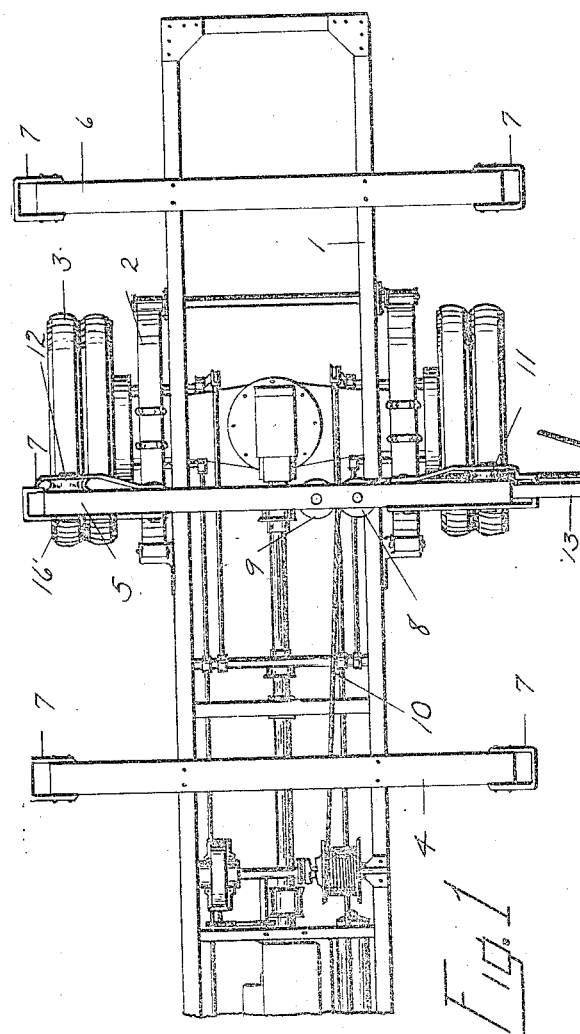
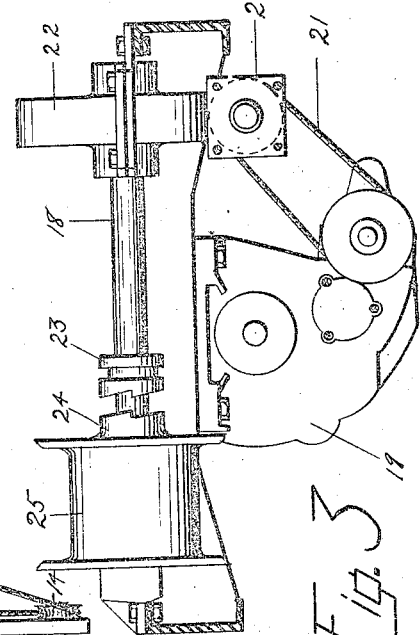
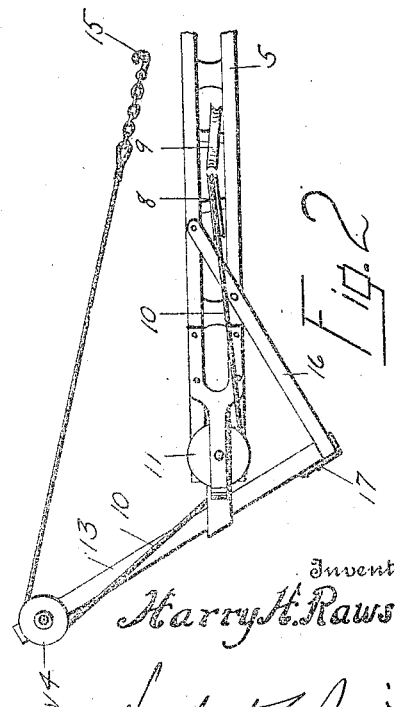

HARRY H. RAWSON, OF SPOKANE, WASHINGTON, ASSIGNOR TO WASHINGTON MACHINERY & SUPPLY COMPANY, OF SPOKANE, WASHINGTON.

LOADING DEVICE.

1,279,157.  Specification of Letters Patent.  Patented Sept. 17, 1918.

Application filed July 18, 1918. Serial No. 245,492.

*To all whom it may concern:*

Be it known that I, HARRY H. RAWSON, a citizen of the United States, residing at Spokane, in the county of Spokane, State of Washington, have invented certain new and useful Improvements in Loading Devices, of which the following is a specification.

The present invention relates to an improved loading device, applicable for use on portable vehicles such as automobile trucks, and especially designed for loading logs for transportation upon the truck, the primary object of the invention being the provision of an apparatus that is simple in construction and operation and which may be manipulated with facility at slight expense, but with a great saving in labor.

The invention consists essentially in certain novel combinations and arrangements of parts that are attachable to and detachable from the truck, and includes operative means that are actuated from the vehicle motor, as will be hereinafter described and claimed.

In the accompanying drawings one complete example of the physical embodiment of the invention is illustrated, constructed and arranged according to the best mode so far devised for the practical application of the principles of the invention.

Figure 1 is a plan view of the apparatus forming the subject matter of the invention, illustrating its application to a motor vehicle.

Fig. 2 is a front elevation showing the supports for the operating parts of the device.

Fig. 3 is a view illustrating the manner of securing the necessary power from the vehicle motor.

In the preferred embodiment of the invention as illustrated in the drawings the motor vehicle or, truck is provided with the usual rectangular frame 1, and the rear springs 2 and rear wheels 3 are also depicted in Fig. 1 in order that a clear understanding of the invention may readily be secured.

Arranged transversely of the channel irons that form the rectangular frame of the vehicle, are a plurality of bolsters in the form of beams as 4, 5, and 6, and at the ends these bolsters are provided with the usual pockets or sockets 7 for the reception of the customary staves, not shown in the drawings.

The intermediate bolster 5 is specially adapted for the present invention, and like the other beams is secured firmly to the frame of the vehicle and adapted to support a portion of the load of logs.

At one side of the center of the intermediate bolster, are journaled a pair of sheaves or pulleys 8 and 9, which are arranged on planes at an angle and the sheaves are located in close proximity so that their grooves, or grooved peripheries, will prevent the escape of the rope or cable 10, which passes around one or the other of the two wheels. At each end of the intermediate bolster is journaled a vertically arranged pulley or idler 11 and 12, and the pulleys are adapted for use in pairs as 8, 11, and 9, 12, depending upon the side from which the logs are to be loaded on the truck. In connection with the intermediate bolster, a special stave 13 is employed, and equipped with a vertically arranged sheave 14 at its upper end, over which the cable 10 passes, and at its end, the cable is provided with the usual hook 15. In its normal position the stave is supported in the pocket 7 at the end of the bolster in the inclined or oblique angle as shown in Fig. 2, and at its lower end, which projects below the bolster, the stave is supported on a brace arm 16 that is bolted at the sides of the bolster, and an additional support is provided in the cleat 17, at the junction of the stave and brace arm, which prevents the stave from slipping.

At the opposite end of the intermediate bolster an additional and duplex brace 16' is provided so that the stave 13 may be removed from the side of the truck as shown in Fig. 1 of the drawings and replaced at the opposite side, when such use is required.

The loading cable is wound upon the drum 25 which is loose on the shaft 18 that is journaled in the rectangular frame in close proximity to the motor engine 19, and power is transmitted from the motor to the drum shaft through the interposition of the worm 20 (indicated in dotted lines Fig. 3) sprocket chain 21, which is driven from the engine by a sprocket wheel (not shown) and a worm wheel within the housing 22, the worm wheel being located on the shaft 18. When the clutch member 23, keyed on the shaft 18, is moved into contact with the clutch member 24 of the loose drum, the drum will be revolved from the motor of the truck to wind the cable thereon, which, in its movement passes over the pulleys as described.

The logs are hauled or rolled transversely of the truck over the bolsters, up over planks or timbers supported on the stake pockets, and as the stake 13 is arranged at the angle as shown in Fig. 2 it will be evident that the logs may be rolled entirely across the supporting frame, against the stake pins (not shown) at the near side of the apparatus in Fig. 1, thus utilizing the maximum space on the bolsters. Usually three or four tiers of logs are placed on the truck in this manner, and the utilization of the loading mechanism eliminates considerable time and labor in this operation.

Claims—

1. The combination with a truck, its frame, and motor, of a log loading device including transverse bolsters secured on the frame, and one of said bolsters having a detachable end-stave supported thereon and inclined to the perpendicular, a drum on the frame and means for operating it, a cable wound on the drum, a pair of guide pulleys on the said bolster for the cable, and a guide pulley at the upper end of the stave over which the end of the cable is passed, for the purpose described.

2. The combination with the rectangular frame of a motor truck and a plurality of bolsters arranged transversely and secured thereon, one of said bolsters having an end socket and a brace arm and an inclined stave supported thereby, a pair of pulleys on the said bolster and a pulley at the top of the stave, a winding drum and driving shaft on the frame and means for operating the drum from the truck motor, and a loading cable wound on the drum and passed over said pulleys for the purpose described.

In testimony whereof I affix my signature.

HARRY H. RAWSON.